(12) United States Patent
Barrillon et al.

(10) Patent No.: US 8,302,381 B2
(45) Date of Patent: Nov. 6, 2012

(54) METHOD FOR CONTROLLING THE TEMPERATURE OF THE EXHAUST GASES OF A THERMAL ENGINE

(75) Inventors: Pascal Barrillon, Issy les Moulineaux (FR); Emmanuel Poilane, Arpajon (FR); Fabrice Gauvin, Mennecy (FR)

(73) Assignee: Renault S.A.S., Boulogne-Billancourt (FR)

( * ) Notice: Subject to any disclaimer, the term of this patent is extended or adjusted under 35 U.S.C. 154(b) by 302 days.

(21) Appl. No.: 12/521,638

(22) PCT Filed: Dec. 21, 2007

(86) PCT No.: PCT/EP2007/064461
§ 371 (c)(1),
(2), (4) Date: Nov. 16, 2009

(87) PCT Pub. No.: WO2008/083917
PCT Pub. Date: Jul. 17, 2008

(65) Prior Publication Data
US 2010/0307137 A1    Dec. 9, 2010

(30) Foreign Application Priority Data
Dec. 29, 2006  (FR) ..................................... 06 56039

(51) Int. Cl.
*F01N 3/18* (2006.01)
(52) U.S. Cl. ................ 60/285; 60/274; 60/295
(58) Field of Classification Search ............ 60/274, 60/285, 295, 297, 301, 311
See application file for complete search history.

(56) References Cited

U.S. PATENT DOCUMENTS

| | | | |
|---|---|---|---|
| 5,402,641 A | 4/1995 | Katoh | |
| 5,626,014 A * | 5/1997 | Hepburn et al. | 60/274 |
| 6,971,230 B1 | 12/2005 | Bluhm et al. | |
| 7,775,033 B2 * | 8/2010 | Colignon | 60/277 |
| 2004/0128982 A1* | 7/2004 | Patchett et al. | 60/274 |
| 2004/0187477 A1 | 9/2004 | Okugawa et al. | |
| 2004/0187483 A1* | 9/2004 | Dalla Betta et al. | 60/286 |
| 2005/0115227 A1* | 6/2005 | Surnilla et al. | 60/295 |
| 2005/0247052 A1 | 11/2005 | Kobayashi et al. | |
| 2006/0070373 A1* | 4/2006 | Huang et al. | 60/286 |
| 2006/0086082 A1 | 4/2006 | Bluhm et al. | |

FOREIGN PATENT DOCUMENTS
DE    199 52 830    5/2001
(Continued)

*Primary Examiner* — Kenneth Bomberg
*Assistant Examiner* — Jorge Leon, Jr.
(74) *Attorney, Agent, or Firm* — Oblon, Spivak, McClelland, Maier & Neustadt, L.L.P.

(57) ABSTRACT

A method for controlling temperature of a gas post-treatment system in an exhaust circuit of a thermal engine having a more or less rich combustion mode, in which at least a post-treatment member is periodically submitted to regeneration phase at a set-point temperature. The duration of each regeneration phase is divided into a series of fractioned periods for tuning the engine alternatively according to two combustion modes each having a different richness, respectively a mode hotter than necessary for reaching the set-point temperature and a mode that is not so hot, the duration of each period being controlled so that excess energy introduced during a hotter mode period is compensated by the lack of energy in the following period with the less hot mode, and conversely, to maintain at the output of the post-treatment member a mean temperature corresponding to the set-point temperature.

9 Claims, 3 Drawing Sheets

FOREIGN PATENT DOCUMENTS

| | | |
|---|---|---|
| EP | 0580389 | 1/1994 |
| FR | 2 853 006 | 10/2004 |
| FR | 2 872 206 | 12/2005 |
| WO | WO 2006005868 A2 * | 1/2006 |

* cited by examiner

METHOD FOR CONTROLLING THE TEMPERATURE OF THE EXHAUST GASES OF A THERMAL ENGINE

BACKGROUND

The subject of the invention is a method and a device for controlling the temperature of the exhaust gases of a combustion engine, particularly during phases of regenerating the post-treatment system.

In order to reduce the pollution produced by internal combustion engines it is necessary to fit increasingly complex gas post-treatment systems in the exhaust line, particularly in the case of lean-burn engines.

Unlike a conventional oxidation catalytic converter which eliminates carbon monoxide and hydrocarbons still to be burnt, such systems are designed notably to reduce the emissions of particulates and of nitrogen oxide and operate discontinuously or alternately.

What happens in such systems is that the pollutants are trapped and stored in normal engine operation and are periodically treated, during regeneration phases, which require a special combustion mode in order to guarantee the thermal and/or fuel richness levels needed.

To do this, the rate of fuel injection into the combustion chambers of the cylinders can be set as required in order to operate in a richer or less-rich combustion mode and this results in a variation in the temperature of the exhaust gases and in the proportion of oxidizing and reducing agents in these gases.

Furthermore, in the case of a vehicle engine, the flow rate and temperature of the exhaust gases are also, at each instant, dependent on the engine speed demanded by the driver to suit the driving conditions.

Operation of a post-treatment system has therefore to take various factors into consideration.

For example, in order to reduce emissions of nitrogen oxides $NO_x$ in an overall oxidizing mixture such as the exhaust gases of an engine, a catalytic converter comprising a means of accumulating the nitrogen oxides and known as a "$NO_x$-trap" is usually arranged in the cleaning system and is built into the exhaust line and traps the nitrogen oxides emitted during normal engine operation. The operation of a $NO_x$-trap catalytic system such as this is described in detail, for example, in document EP-A-0 580 389.

A catalytic converter such as this is periodically regenerated by running the engine rich for a certain length of time in order to break down the nitrates by releasing $NO_x$ which is then reduced to nitrogen by the reducing agents such as $H_2$, HC and CO contained in the exhaust gases, in the way described in the abovementioned document.

Likewise, in order to eliminate particles of soot present in the exhaust gases, the post-treatment system normally comprises a particulate filter, for example a catalytic filter, the interior wall of which is covered with a coat of a material impregnated with precious metals, known as a "wash coat" that performs an oxidation function aimed at reducing the temperature at which the particles of soot are burnt.

In order to prevent a particulate filter such as this from becoming blocked with the soot it is necessary periodically to perform a regeneration which consists of burning the soot by raising the temperature of the exhaust gases in the particulate filter to a setpoint temperature of the order of 600° C. This rise in temperature can be obtained with a degradation in engine efficiency, by appropriate regeneration-aid means.

To this end, it is also possible to position an additional injector in the exhaust, upstream of the catalytic converter, in order to vary the proportions of oxidizing and reducing agents.

Further, to optimize the treatment of all the pollutants, it is necessary to have tight control over the storage and regeneration phases of the post-treatment members by regulating, as far as possible, the thermal power developed within these traps in order to optimize the combustion of soot in the case of the particulate filter and the filling, the reduction of nitrogen oxides and the desorption of sulfur in the case of a $NO_x$-trap, because these combustion, oxidation, adsorption or reduction reactions are directly dependent on the temperature of the support of these traps and of the gases passing through them.

However, it is also necessary to avoid any potential temperature spikes that might carry the risk of damaging the catalytic converter, by controlling the thermal power leaving the first post-treatment system which is generally of the oxidation catalytic converter or $NO_x$-trap type, so as to keep the temperature within a window close to the maximum temperature of use.

In a known way, such control may be had by measuring the catalytic converter internal temperature using sensors placed within this converter. However, installing a sensor within the catalytic converter is difficult and presents risks to the integrity of the monolith of which the catalytic converter consists. It is therefore preferable to place the temperature sensor downstream of the catalytic converter, thermal control at the exit from the first post-treatment system being afforded in a "state feedback" control system from a measurement of the temperature of the gases leaving this system. However, the response of such a system is slow and very delayed and, what is more, highly sensitive to changes in inertia of the monolith caused by variations in the temperature of the gases entering the post-treatment system and/or variations in the flow rate of these gases. As a result, the temporal characteristics of the response of such a method at the control level limit the performance of state feedback control in terms of adhering to setpoint values and it may be impossible to avoid occasionally exceeding the maximum permissible temperature. In addition, because the method is so sensitive to the changes in operating conditions, it will be very difficult to achieve adequately stable control over the entire engine operating range without determining its parameters for each of the operating conditions, something which would be inadmissible in terms of the amount of memory that would have to be devoted to this function.

BRIEF SUMMARY

To avoid these disadvantages, the subject of the invention is a novel control method providing thermal regulation within the catalytic converter without being dependent on conditions of observation of the state of the system in order to formulate the appropriate commands.

In particular, the invention is able optimally to adapt itself to the particular conditions of trapping and eliminating the various pollutants that may be contained in the exhaust gases.

In general, the invention therefore relates to a method of controlling the temperature of gases in an exhaust circuit of a combustion engine supplied with a mixture of which the proportion of fuel can be set according to a richer or less rich combustion mode, said exhaust circuit comprising at least one post-treatment member in which at least one pollutant contained in the exhaust gases is trapped and stored, this post-treatment member being periodically subjected to regeneration phases by raising the temperature of the exhaust gases to a setpoint temperature for a regeneration time to allow the stored pollutants to be eliminated.

According to the invention, the time of each regeneration phase is divided into a succession of fractionated periods for setting the engine alternately into two combustion modes with different richnesses, these respectively being a hotter mode for which the incoming thermal power provided by the gases is greater than a setpoint power needed to obtain the setpoint temperature, and a less-hot mode for which the incoming thermal power is less than the setpoint power, the duration of each fractionated period being managed in such a way that the energy surplus provided in a period in hotter mode is compensated for by the energy deficit in the next period in less-hot mode, and vice versa, in order to keep the temperature of the gases leaving the post-treatment member around a mean temperature that corresponds to the setpoint temperature.

Particularly advantageously, the duration of each fractionated period in hotter mode or in less-hot mode is determined in such a way that the energy surplus or deficit provided by the gases during said period, by comparison with the setpoint power, does not exceed a given limit.

To this end, the proportions of fuel in the hotter mode and in the less-hot mode and the respective durations of the fractionated periods are determined in such a way that the amplitude of the variation in the temperature of the gases in the post-treatment member, by comparison with the setpoint temperature (and/or the difference between the power entering the post-treatment member and the setpoint power), do not exceed one and the same limit, in terms of an excess in the hotter mode or in terms of a deficit in the less-hot mode.

According to another preferred feature, the duration of the fractionated periods, in the hotter mode and in the less-hot mode, respectively, are determined in such a way that the energy supplied in each period and which corresponds to the difference between the thermal power $W_e$ entering the post-treatment member and the setpoint power $W_C$ does not, in terms of an excess or in terms of a deficit, exceed one and the same limit $E_{max}$ given by the equation:

$$E_{max} = \alpha \times 2 \times (T_{max} - T_s) \times M \times C_m$$

in which:
- $T_{max}$ is the temperature that must not be exceeded inside the post-treatment member;
- $T_s$ is the setpoint temperature set for the regeneration phase;
- M is the mass of the post-treatment member;
- $C_m$ is the heat capacity of the post-treatment member;
- $\alpha$ is the proportion, with respect to its total length, of the post-treatment member between the exhaust gas inlet zone and the zone in which the temperature reaches its maximum level $T_{max}$.

According to another particularly advantageous feature, the energy surplus or deficit provided by the gases during a period is calculated, at each instant, by integrating as a function of time the difference between the setpoint power and the power entering the post-treatment member.

According to a preferred feature, the setpoint power $W_c$ needed to obtain the setpoint temperature $T_s$ at the outlet of the post-treatment member is equal to the sum of the theoretical power $W_s$ at the outlet of the post-treatment member, and of the losses $W_p$, said theoretical power $W_s$ being given by the formula:

$$W_s = T_s \times Q_{exh} \times C_p$$

in which $T_s$ is the setpoint temperature needed for regeneration, $Q_{exh}$ is the flow rate of the exhaust gases which may vary according to engine speed, and $C_p$ is the heat capacity of the exhaust gases which is dependent on their composition and which may vary according to the combustion mode.

Likewise, the thermal power $W_e$ entering the post-treatment member at each instant may be given by the formula:

$$W_e = T_e \times Q_{exh} \times C_p + W_{exo}$$

in which $T_e$ is the temperature of the gases as measured at each instant upstream of the post-treatment member, $Q_{exh}$ is the flow rate of the exhaust gases, $C_p$ is their heat capacity and $W_{exo}$ is the thermal power provided by the oxidizing and reducing masses reacting in the post-treatment member.

BRIEF DESCRIPTION OF THE DRAWINGS

Other advantageous features of the invention will become apparent from the following description of one particular embodiment, given by way of example and depicted in the attached drawings.

DETAILED DESCRIPTION

Figure 1:
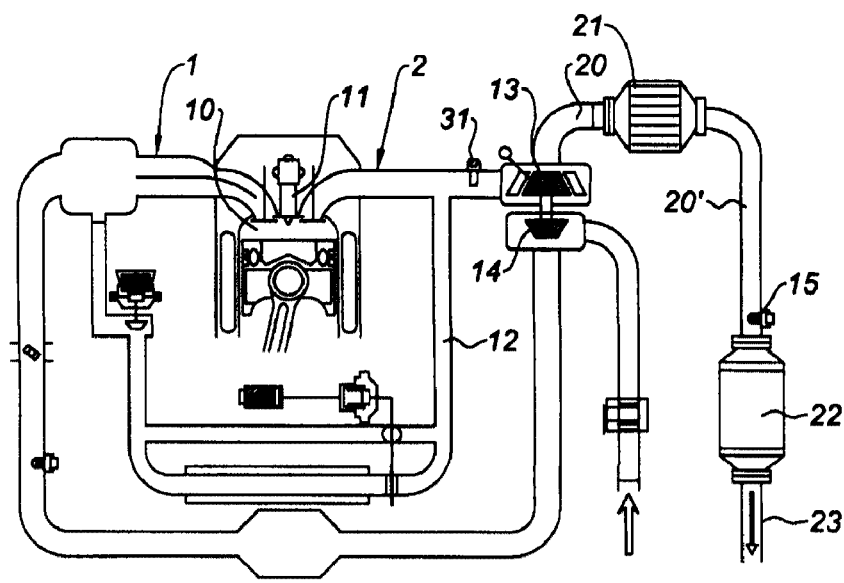
FIG. 1 is a general overview of the intake and exhaust circuits of a combustion chamber of an internal combustion engine.

FIG. 1 schematically depicts a combustion chamber 10 of an engine supplied with fuel by an injector 11 and connected to an air intake circuit 1 and a combustion gas exhaust circuit 2.

In the conventional way, the air intake circuit 1 comprises a compressor 14 driven by a turbine 13 placed on the exhaust circuit 2 which may also feed an EGR circuit 12 that recirculates some of the gases to the engine.

As shown by FIG. 1, various circuits may comprise various auxiliary members such as heat exchangers for heating the air or cooling the recirculated gases, flow regulating electrically operated valves, sensors, etc.

All these well-known arrangements can be embodied in numerous ways and do not require detailed description.

On exiting the turbine, the exhaust gases are returned to the atmosphere via an outlet circuit 20 which, in order to reduce pollution comprises at least one post-treatment member 21.

This post-treatment member, usually of the $NO_x$-trap type, is able to hold and store the nitrogen oxides contained in the exhaust gases and is customarily associated with a particulate filter 22 which holds the particulates contained in the gases, in the form of soot.

Figure 2:
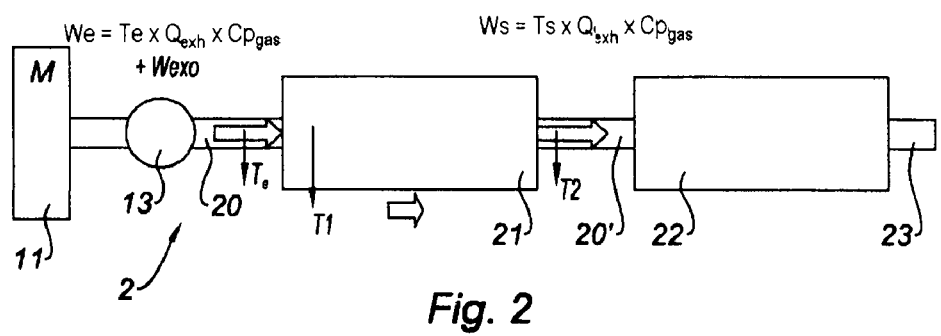
FIG. 2 is a diagram of an exhaust circuit fitted with an exhaust gas post-treatment system.

As shown schematically in FIG. 2, the exhaust circuit 2 of an internal combustion engine 10 customarily comprises, downstream of the turbine 13 a first post-treatment member 21 of the oxidation catalytic converter type and a second member 22 such as a particulate filter, the gases thus depolluted being discharged into the atmosphere through a discharge circuit 23. Often, an additional injector is placed in the exhaust circuit 2.

In the conventional way, the pollutants which, during normal operation, have built up in the post-treatment member 21 are eliminated in regeneration phases, generally by raising the temperature of the gases by setting the engine respectively to a rich mixture for the desorption of the sulfur in the post-treatment member 21 and to a lean burn mixture for burning the soot in the particulate filter 22. To do that, the injector 11 or the additional injector placed in the exhaust, is managed usually by a control unit that receives information transmitted by various sensors and is associated with a model which periodically commands the switch to a regeneration phase and keeps the temperature at the desired setpoint level.

However, the temperature $T_e$ and the flow rate $Q_{exh}$ of the exhaust gases, both measured, for example, by sensors 31 positioned upstream or downstream of the turbine 13, vary at every instant with the engine speed commanded by the driver.

Figure 3:
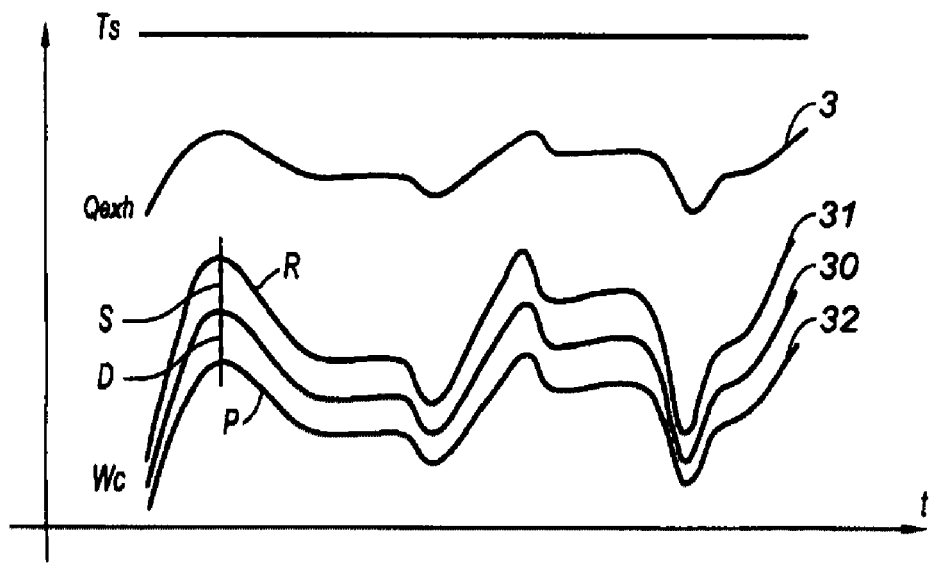
FIG. 3 is a diagram showing an example of how, during the regeneration phase, the flow rate of the exhaust gases varies with engine speed and the corresponding variation in the setpoint power needed and in the incoming thermal power, according to the combustion mode.

For example, in the diagram of FIG. 3, curve 3 shows the possible change, over time, in exhaust gas flow rate which varies as a function of the speed demanded of the engine, that is to say as a function of the position of the throttle pedal, and of the transmission ratio selected during the period in question.

Measurement, estimation or modeling at each instant also provides the composition of the exhaust gases and it is therefore possible from this to deduce their heat capacity $C_p$ at the instant being considered.

Having passed through the catalytic converter 21, the exhaust gases leaving via the pipe 20' have the same flow rate $Q_{exh}$ and their temperature $T_s$, which can be measured by a sensor 15, corresponds to the internal temperature of the catalytic converter 21. The problem of the invention is therefore that of keeping this temperature $T_s$, throughout the duration of a regeneration phase, around a setpoint temperature for which catalytic converter operation is optimal but which, in order to avoid damage to the catalytic converter, must not be exceeded.

In general, the thermal power, expressed in joules per second, of the gases leaving the catalytic converter at a temperature $T_s$ and at a flow rate $Q_{exh}$, is equal to $$W_s = T_s \times Q_{exh} \times C_p \tag{1}$$

$C_p$ being the heat capacity of the gases which is dependent on their composition, that is to say on the combustion mode, richer or less rich, imposed on the engine at that instant.

The principle of thermal management is to provide in the catalytic converter 21 a mean incoming thermal power that is substantially equal to this outgoing thermal power, that is to say to the power removed at the desired setpoint temperature.

This incoming thermal power consists, on the one hand, of the thermal power provided directly by the heat of the gases as a result of their temperature $T_e$ and of their flow rate $Q_{exh}$ and, on the other hand, of the potential power provided indirectly by the exothermal reaction capacity of the masses of oxygen or of reducing agents present in the exhaust gases and which undergo partial or full reaction in the catalytic converter. This exothermal reaction in effect provides additional energy $W_{exo}$ which, in the catalytic converter, combines with the direct heating power of the gases to raise the temperature thereof.

The incoming power $W_e$, expressed in J/s, can thus be written:

$$W_e = T_e \times Q_{exh} \times C_p + W_{exo} \tag{2}$$

This incoming thermal power can thus be calculated by measuring, estimating or modeling the temperature $T_e$ and the flow rate $Q_{exh}$ of the gases in the outlet circuit 20, at the entrance to the catalytic converter 21, and their composition, particularly the emissions of oxygen or of reducing agents, which enable their heat capacity $C_p$ and the potential exothermal reaction power $W_{exo}$ to be determined.

However, those parameters are linked, on the one hand, to the engine operating speed which varies at every instant according to the orders of the driver and, on the other hand, to the combustion mode, that is to say to the fuel richness of the mixture. Thus, a diesel engine normally runs on a lean mixture, but as was seen earlier, it is periodically switched to a richer, and hotter, mode in the phases of regeneration of the post-treatment members which require a rich gas composition and a higher gas temperature.

The thermal power entering the catalytic converter is therefore dependent on the combustion mode which determines the temperature $T_e$. However, because this is linked to the gas flow rate, it varies in the same way as this parameter as a function of the engine speed ordered by the driver.

In the diagram of FIG. 3, curve 3 provides an example of the possible change, over a period of time, in the flow rate of the exhaust gases $Q_{exh}$ to obtain an outlet temperature $T_s$, this flow rate varying in a certain way according to the speed demanded of the engine.

The thermal power that gases at this temperature have to provide in order to obtain a substantially constant outlet temperature $T_s$ changes in the same way as the flow rate of the gases as a function of engine speed, but is also dependent on the richness of the mixture according to the combustion mode chosen, and on losses.

Curve 30 indicates the change in setpoint power $W_c$ theoretically needed, taking losses into consideration, to obtain the setpoint temperature at the exit from the catalytic converter.

However, it is difficult to set the operation of the engine during the regeneration time in order, at each instant, to provide the power needed to obtain and maintain the setpoint temperature.

To address this problem, the idea of the invention is to control an alternation of rich and lean phases, combining them in such a way as to provide either an excess of energy by a richer combustion mode (R) which is therefore hotter than necessary, or a deficit of energy using a leaner combustion mode (P) which is therefore not as hot as necessary, it being possible for this energy excess and deficit to compensate for one another in such a way as to keep the temperature in the catalytic converter at a mean value corresponding to the setpoint temperature.

In the diagram of FIG. 3, for example, the change over time in thermal power provided by the gases entering the catalytic converter are depicted in curve 31 for the hot mode and in curve 32 for the cold mode.

Given that the incoming thermal and potentially exothermal power $W_e$ of the gases is linked to the hotter or less-hot combustion mode but that the flow rate is dependent only on the speed demanded of the engine, the two curves 31, 32 are substantially parallel and offset on each side of the curve 30 that corresponds to the power $W_c$ theoretically needed to obtain and maintain the setpoint temperature.

Hence, at each instant, the change in mode makes it possible to obtain either, in hot mode (R), an energy surplus S by comparison with the power theoretically needed or, in cold mode (P), an energy deficit D.

According to the invention, by controlling the respective durations of the periods of operation in each of the two modes, it will be possible to compensate the energy surplus provided during a hot mode period with the energy deficit provided during the next cold mode period, so as to maintain an optimal mean temperature.

Figure 4:
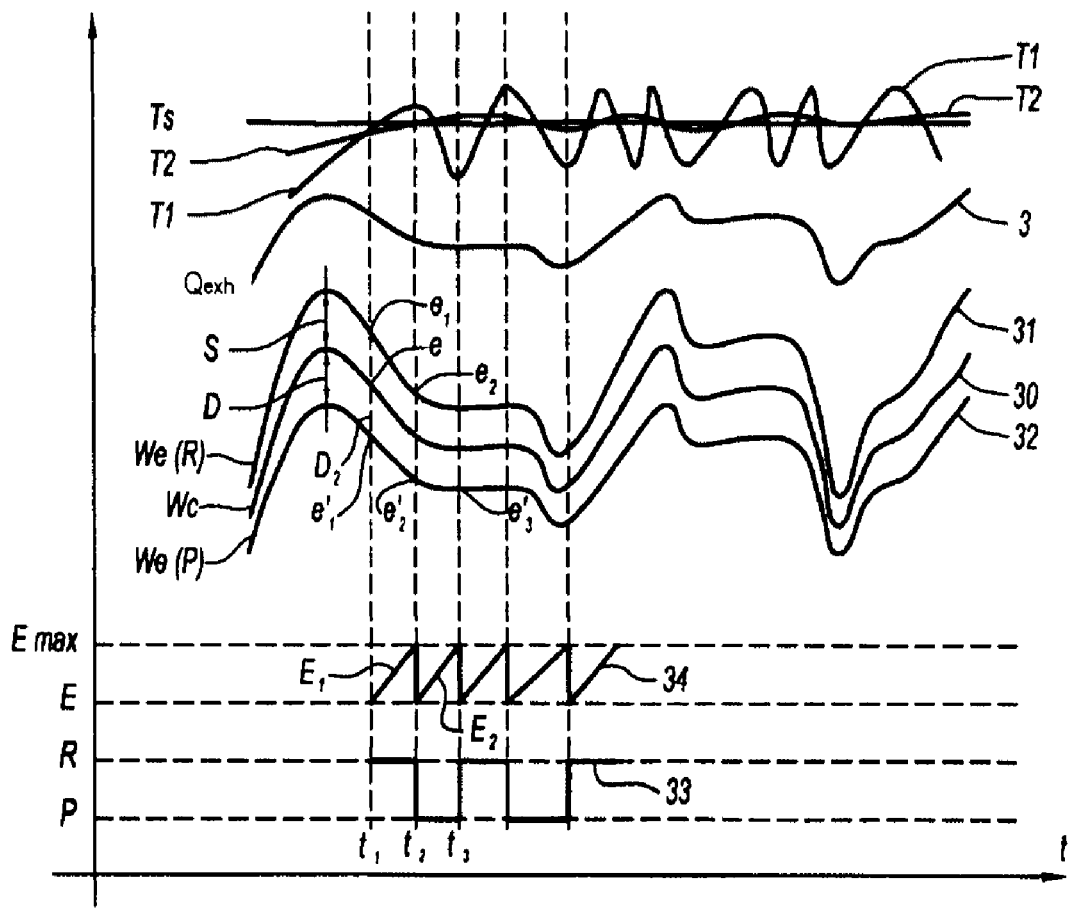
FIG. 4 is a general diagram illustrating the method according to the invention.

FIG. 4 is an overall diagram illustrating the successive steps in such a method.

In the upper part of this diagram, curve 3 indicates, along the ordinate axis, the change in exhaust gas flow rate which can vary as a function of the orders given by the driver of the vehicle during the regeneration time indicated along the abscissa axis and of which the duration, according to the regeneration method, may range, for example, from a few tens of seconds to several minutes.

Curve 30, like in FIG. 3, indicates the theoretical power $W_c$ that the gases ought to provide in order to maintain a constant temperature $T_s$ at the exit from the catalytic converter.

As indicated above, because this temperature is constant, the setpoint power $W_c$ varies in the same way as the flow rate.

According to the invention, the injection of fuel will be modified alternately to switch from a combustion mode that is richer than necessary to a less-rich combustion mode.

The resulting thermal powers at the entry into the catalytic converter are indicated, as in FIG. 3, by curve 31 for the hotter mode (R) and curve 32 for the less-hot mode (P).

The injection of fuel in each of these two modes, hot and cold respectively, can be set in such a way that, at a determined instant, and depending on the chosen combustion mode and engine speed, the surplus power S provided in hot mode with respect to the power $W_c$ theoretically needed is of the same order, in terms of absolute value, as the power deficit D resulting, at the same instant, from operation in cold mode. As a result, at an instant $t_1$, the two points $e_1$ on curve 31 and $e'_1$ on curve 32, which correspond to the hot mode (R) and to the cold mode (P), respectively, are symmetric with respect to the point e on the curve 30 that corresponds to the theoretical setpoint power $W_c$.

According to the invention, the regeneration time is divided into a succession of fractionated periods of operation in hot mode (R) and in cold mode (P) alternately, in the way depicted in the bottom of the diagram by the square-wave line 33.

Thus, the top level, between times $t_1$ and $t_2$, corresponds to a period in hot mode during which the incoming power follows curve 31 between points $e_1$ and $e_2$, and the bottom level, between instants $t_2$ and $t_3$, corresponds to a period in cold mode during which the incoming power $W_e$ follows curve 32 between points $e'_2$ and $e'_3$.

The energy absorbed by the catalytic converter during a period corresponds to the integral, as a function of time, or the power provided by the gases. It is thus possible, through integration, to determine the energy excess or deficit absorbed by the catalytic converter and corresponding to the excess S or deficit D of power provided by the gases during this period.

Line 34 indicates the variation, in terms of absolute value, during each fractionated period, of this energy excess or deficit with respect to the energy E theoretically needed to keep the catalytic converter at a constant temperature $T_s$.

At the top of the diagram, curve $T_1$ indicates the variations in the temperature of the gases entering the catalytic converter 21, and curve $T_2$ indicates the variations in the temperature at the outlet.

From the instant $t_1$ onward, the engine operates in hot mode and the temperature $T_1$ at the entry to the catalytic converter increases progressively.

As a result, the temperature $T_2$ of the gases also increases progressively at the outlet from the catalytic converter, with a phase shift due to thermal inertia.

For optimal catalytic converter operation, the amplitude of the variation in its internal temperature, and therefore in the absorbed energy, needs to be limited. Thus a maximum value $E_{max}$, in terms of absolute value, can be set for the difference, in terms of an excess or in terms of a deficit, between the energy absorbed and the constant energy E theoretically needed to compensate for losses, by keeping the outlet temperature $T_s$ at a constant level.

In hot mode, the energy absorbed $E_1$ is greater than the energy needed E and the difference increases progressively, as indicated by line 34 on the diagram of FIG. 4, between instants $t_1$ and $t_2$.

At the instant $t_2$, this excess energy $E_1$ provided by the gases reaches the maximum value $E_{max}$ and the engine is then switched to cold mode, following a low level of line 33. This results in an energy deficit $E_2$ which is obtained by integrating the power deficit $D_2$ and the value of which, in absolute terms, increases progressively to reach the same maximum value $E_{max}$ at the instant $t_3$. During the period $t_2$, $t_3$, the temperature $T_1$ at the inlet to the catalytic converter decreases and this, with a delay, results in a reduction in the temperature $T_2$ at the exit from the catalytic converter.

By thus limiting to the same value $E_{max}$ the difference, in terms of an excess or in terms of a deficit, between the energy provided and the energy theoretically needed and, therefore, the amplitude of variation of $T_1$, it is possible to damp out variations in temperature $T_2$ at the exit from the catalytic converter 21 in such a way that this outlet temperature remains around a mean temperature corresponding to the setpoint temperature $T_s$.

The duration of each fractionated period $t_1$, $t_2$ in the hot mode (R) or $t_2$, $t_3$ in the cold mode (P) and so on, is therefore determined by commanding a change in combustion mode at the instant at which the energy difference reaches, in terms of an excess or in terms of a deficit, the limit value $E_{max}$.

According to the invention, the engine will therefore be switched alternately from a combustion mode known as the "hot mode", which is richer than is needed to obtain the setpoint power, to a leaner mode known as the "cold mode", by managing the duration of the fractionated periods in such a way that the surplus energy provided in a "hot" mode period is compensated for by the loss of energy during the next "cold" mode period, the switch from one mode to the other being commanded when the energy surplus or deficit reaches a maximum value $E_{max}$ which is determined in such a way as to limit the amplitude of the variation in temperature within the monolith of which the catalytic converter was made.

Figure 5:
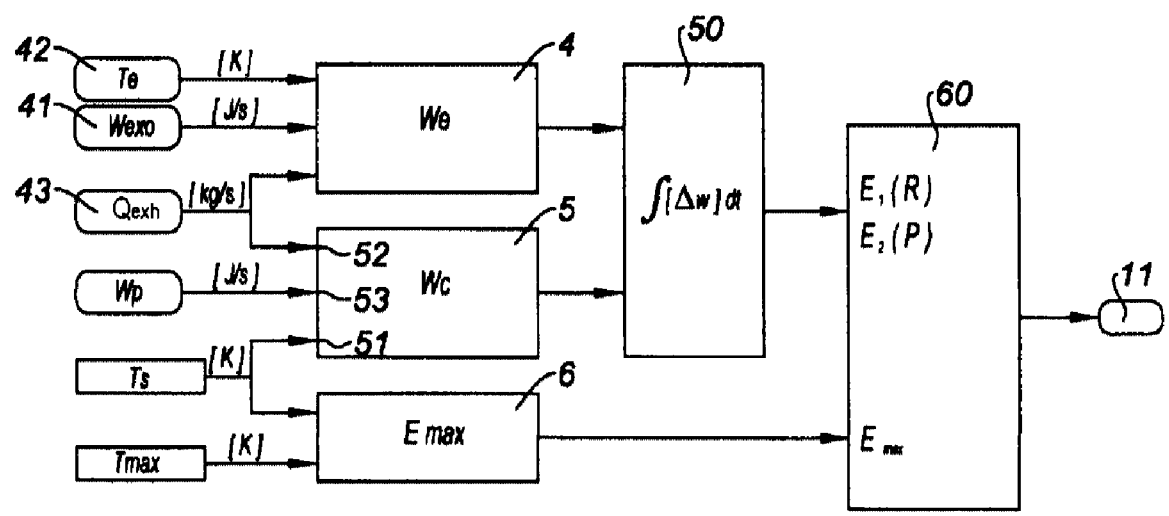
FIG. 5 is a diagram of a temperature control system for implementing the method.

To do that, the means of setting the combustion mode of the engine, that is to say, essentially, the fuel injection, may advantageously be managed by a control unit of the type depicted by way of preferred example in FIG. 5.

To implement the method, the two combustion modes, rich and lean respectively, are first of all optimized by establishing a map that can be used to estimate, at each instant, the exothermal reaction power $W_{exo}$ that will be provided, in each of the two modes, by the oxidizing and reducing masses reacting in the post-treatment member.

This exothermal power $W_{exo}$ is estimated by this potential exotherm 41 which applies a corresponding signal to one input of a calculation unit 4 that calculates the incoming power $W_e$. This calculation unit 4 also receives signals corresponding, respectively, to the temperature $T_e$ and to the flow rate $Q_{exh}$ of the gases entering the monolith and which can be measured by sensors 42, 43 or estimated as a function of engine speed.

The energy potential of the engine setting is thus measured and estimated by the calculation unit 4 using the equation mentioned earlier:

$$W_e = T_e \times Q_{exh} \times C_p + W_{exo} \qquad (2)$$

By knowing the setpoint temperature $T_s$ that needs to be kept substantially constant at the outlet from the first catalytic converter 21 and the corresponding outcoming power $W_s$, a calculation unit 5 determines the setpoint power $W_c$ needed in order to obtain this temperature $T_s$, on the basis of the information displayed on its inputs 51, 52, 53 which relate, respectively, to the setpoint temperature $T_s$, to the flow rate $Q_{exh}$ of the gases which is measured or estimated upstream of the catalytic converter 21, and to the loss of energy $W_p$ in the catalytic converter, which can be estimated or determined by modeling.

The calculation unit 5 thus determines the setpoint power by applying the equation:

$$W_c = W_s + W_p \tag{3}$$

As indicated above, the incoming power $W_e$ depends on the combustion mode, that is to say on the exothermal reaction power $W_{exo}$ and can vary during the regeneration phase as a function of engine speed, as in the way indicated, for example, by curves 31 and 32 of the diagram of FIG. 4, the setpoint power $W_c$ determined by the calculation unit 5 varying in the same way following curve 30.

From the variables $W_e$, $W_c$ thus determined by the calculation units 4 and 5, a calculation unit 50 will, from this, at each instant, deduce the difference:

$$\Delta_w = W_c - W_e \tag{4}$$

and by integrating the difference thus calculated, will deduce the value:

$$E = \int |\Delta_w| dt \tag{5}$$

of the excess $E_1$, or, depending on the combustion mode, of the energy deficit $E_2$ absorbed by the catalytic converter up to the instant in question, by comparison with the energy needed to maintain the setpoint temperature.

As indicated above, the durations of the fractionated periods $t_1$, $t_2$ in rich mode, and $t_2$, $t_3$ in lean mode, $t_3$, $t_4$ in rich mode, and so on and so forth, are determined by reversing the combustion mode each time this excess $E_1$ or deficit $E_2$ of energy provided to the catalytic converter reaches, in terms of absolute value, the set limit $E_{max}$.

This limit value $E_{max}$ is determined by a calculation unit 6 by applying the equation:

$$E_{max} = \alpha \times 2 \times (T_{max} - T_s) \times M \times C_m \tag{6}$$

in which:

$T_{max}$ is a maximum temperature, displayed at the input to the unit 6, that cannot be exceeded inside the post-treatment member, M is the total mass of the monolith of which the catalytic converter is formed;

$C_m$ is the heat capacity of the monolith;

$\alpha$ is the proportion, with respect to its total length, of the monolith between the exhaust gas inlet zone and the zone in which the temperature reaches its maximum level $T_{max}$.

The value $E_{max}$ thus determined by the calculation unit 6 and the value of the excess $E_1$ or deficit $E_2$ of energy as determined by the calculation unit 50, are displayed on a comparator 60 which, when the difference is zero, issues to the fuel injection means 11 an order to switch from a rich mode (R) to a lean mode (P) or vice versa.

Thus, as indicated in the upper part of the diagram of FIG. 4, the temperature $T_2$ at the outlet from the catalytic converter 21 can be kept around a mean value which corresponds to the setpoint temperature $T_s$.

The invention thus makes it possible, by managing the injection of fuel into the engine, to keep the temperature inside the catalytic converter at an optimal level that is as high as possible but below a predetermined temperature $T_{max}$.

It is thus possible, under optimal conditions, to regenerate the first post-treatment system 21, and in particular, to remove sulfur from the catalytic converter.

However, in as much as the temperature of the gases leaving the catalytic converter 21 is kept substantially constant, it is also possible at the same time by burning the soot to regenerate a second post-treatment system 22 positioned downstream, particularly a particulate filter or four-way system.

It should be noted, that alternating the fractionated periods will make it possible under optimum conditions to regenerate the post-treatment systems, which regeneration is preferably performed in rich mode for the removal of sulfur and in lean mode for burning the soot in the particulate filters.

However, the invention is not restricted to the embodiment that has just been described simply by way of example but encompasses all alternative forms thereof that employ equivalent means and other applications using analogous means for regenerating post-treatment systems.

Thus, to regenerate conventional systems, there will be alternate switching between a rich mode and a lean mode but, in certain cases, it may be advantageous to manage the fractionation on the basis of two different lean modes, these respectively being a hotter one and a cooler one, for example for regenerating soot in a post-treatment system of the particulate filter or four-way system type positioned downstream of a first system of the DOC, $NO_x$ trap or four-way type.

Likewise, it would be possible, using two distinct lean modes, to optimize the efficiency with which nitrogen oxides are treated in an SCR (Selective Catalytic Reduction) system positioned downstream of a DOC.

The invention claimed is:

1. A method of controlling temperature of a system for post treatment of gases in an exhaust circuit of a combustion engine supplied with a mixture of which the proportion of fuel can be set according to a richer or less rich combustion mode, the exhaust circuit including at least one post treatment member in which at least one pollutant contained in the exhaust gases is trapped and stored, the method comprising:

periodically subjecting the post treatment member to regeneration phases by raising the temperature of the exhaust gases to a setpoint temperature for a regeneration time to allow stored pollutants to be eliminated, a time of each regeneration phase being divided into a succession of fractionated periods, each of the fractionated periods alternating between two modes including a hotter mode for which incoming thermal power provided by the gases is greater than a setpoint power needed to obtain the setpoint temperature, and a less hot mode for which the incoming thermal power is less than the setpoint power, a duration of each period being managed so as to keep the temperature of the gases leaving the post treatment member around a mean temperature corresponding to the setpoint temperature, for each fractionated period the subjecting the post treatment member to the regeneration comprises:

determining the setpoint power that the exhaust gases at an outlet from a post treatment member should provide to maintain the setpoint temperature of the exhaust gases at the outlet from the post treatment member;

calculating the incoming thermal power provided by the exhaust gases at an inlet into the post treatment member;

calculating an energy absorbed by the post treatment member during a fractionated period based on a difference between the thermal power provided by the exhaust gases and the setpoint power that the exhaust gases should provide to maintain the setpoint temperature, the energy absorbed being an excess of energy when the fractionated period is in the hotter mode and the energy absorbed being a deficit of energy when the fractionated period is in the less hot mode; and switching from the hotter mode to the less hot mode at an instant that an absolute value of the calculated energy absorbed by the post treatment member is equal to a predetermined maximum value and switching from the less hot mode to the hotter mode at an instant that the absolute value of the calculated energy absorbed by the post treatment member is equal to the predetermined maximum value, such that the energy excess provided in a fractioned period in the hotter mode is compensated for by the energy deficit in a next fractionated period in the less hot mode, and vice versa, to maintain the setpoint temperature.

2. The method as claimed in claim 1, wherein the hotter modes and less hot modes are obtained by a combustion with different richnesses.

3. The method as claimed in claim 1, wherein the incoming thermal power provided by the gases at the inlet into the post treatment member is set by injecting fuel upstream of the post treatment member, by an additional injector on the exhaust.

4. The method as claimed in claim 1, wherein proportions of fuel in the hotter mode and in the less hot mode and the respective durations of the fractionated periods are determined such that amplitude of variation in the temperature of the gases in the post treatment member, by comparison with the setpoint temperature, does not exceed a same limit, in terms of an excess in the hotter mode or in terms of a deficit in the less hot mode.

5. The method as claimed in claim 1, wherein the duration of each fractionated period in the hotter mode is determined such that a maximum temperature inside the post treatment member does not exceed a given limit.

6. The method as claimed in claim 1, wherein the duration of the fractionated periods in the hotter mode and in the less hot mode, respectively, are determined such that the energy supplied in each period corresponds to a difference between the incoming thermal power $W_e$ entering the post treatment member and the setpoint power $W_C$ and does not, in terms of an excess or in terms of a deficit, exceed the maximum energy value $E_{max}$ given by equation:

$$E_{max} = \alpha \times 2 \times (T_{max} - T_s) \times M \times C_m$$

in which:
- $T_{max}$ is a maximum temperature that must not be exceeded inside the post treatment member;
- $T_s$ is the setpoint temperature;
- $M$ is a mass of the post treatment member;
- $C_m$ is a heat capacity of the post treatment member;
- $\alpha$ is a proportion, with respect to a total length, of the post treatment member between the inlet thereto and a zone in which the temperature reaches its maximum level $T_{max}$.

7. The method as claimed in claim 4, wherein the excess energy or deficit provided by the gases during one of the fractionated periods is calculated, at each instant, by integrating as a function of time a difference between the setpoint power and the incoming thermal power entering the post treatment member.

8. The method as claimed in claim 1, wherein the setpoint power needed to obtain the setpoint temperature at the outlet of the post treatment member is equal to a sum of a theoretical power $W_s$ and of losses, the theoretical power $W_s$ being given by formula:

$$W_s = T_s \times Q_{exh} \times C_p$$

in which $T_s$ is the setpoint temperature needed for regeneration, $Q_{exh}$ is a flow rate of the exhaust gases which may vary cording to engine speed, and $C_p$ is a heat capacity of the exhaust gases which is dependent on their composition and which may vary according to the combustion mode.

9. The method as claimed in claim 1, wherein the incoming thermal power $W_e$ entering the post treatment member at each instant is given by formula:

$$W_e = Te \times Q_{exh} \times C_p W_{exo}$$

in which $T_e$ is the temperature of the gases as measured at each instant upstream of the post treatment member, $Q_{exh}$ is a flow rate of the exhaust gases, $C_p$ is a heat capacity of the exhaust gases, and $W_{exo}$ is a thermal power provided by oxidizing and reducing masses reacting in the post treatment member.

* * * * *